Herman Holland
INVENTOR.

BY
HIS PATENT ATTORNEY

Patented July 21, 1953

2,646,070

UNITED STATES PATENT OFFICE 2,646,070

HYDRAULIC FLOW REGULATOR

Herman Holland, San Diego, Calif., assignor to Consolidated Vultee Aircraft Corporation, a corporation of Delaware Application June 25, 1947, Serial No. 757,022

5 Claims. (Cl. 137—509)

The present invention relates to the regulation of fluid flow and more particularly to improved flow regulator valves and systems for the parallel operation of a plurality of fluid motors.

In fluid actuating systems wherein a plurality of motors operate a number of separate devices, it is frequently desirable that the devices move in synchronism, or substantially simultaneously. Where the motors are loaded to equal extents it is usually possible to provide suitable actuating motors and a fluid system which will cause the devices to be moved simultaneously. Where the individual loads on each of the actuating motors, however, differ to any extent, the most heavily loaded device usually lags behind those which are more lightly loaded. The present invention is accordingly more particularly directed to the provision of improved flow regulator valves and systems for maintaining the synchronized operation of such multiple actuation cylinders or motors.

It is therefore a primary object of this invention to provide an improved regulator valve for a multiple motor system which will regulate the flow of fluid to each motor in such manner that they are each moved in unison regardless of the individual load imposed on the respective cylinders. A further object of the present invention resides in the provision of a regulator valve which is reasonably produced, is compact and foolproof in construction and operation, and which requires relatively little maintenance and servicing. A still further object of the present invention is the provision of an improved hydraulic system utilizing a plurality of improved regulator valves in conjunction with the parallel operation of a plurality of actuating cylinders for the synchronized movement of individually varying loads. It it a still further object to provide such an improved hydraulic system utilizing the novel flow regulator valve of the present invention, in which the valves may be set for a given working pressure to be used within the system and the actuating motors will operate in synchronism despite a variation in the loads which may be applied to them. Still further objectives of the present invention reside in the improved construction of the valves per se as well as in their particular relationship to the actuating cylinders and the other elements of the improved operating system.

Other objects and advantages of the present invention will occur to those skilled in the art after reading the present description taken together with the accompanying drawings forming a part hereof, in which.

Figure 1:
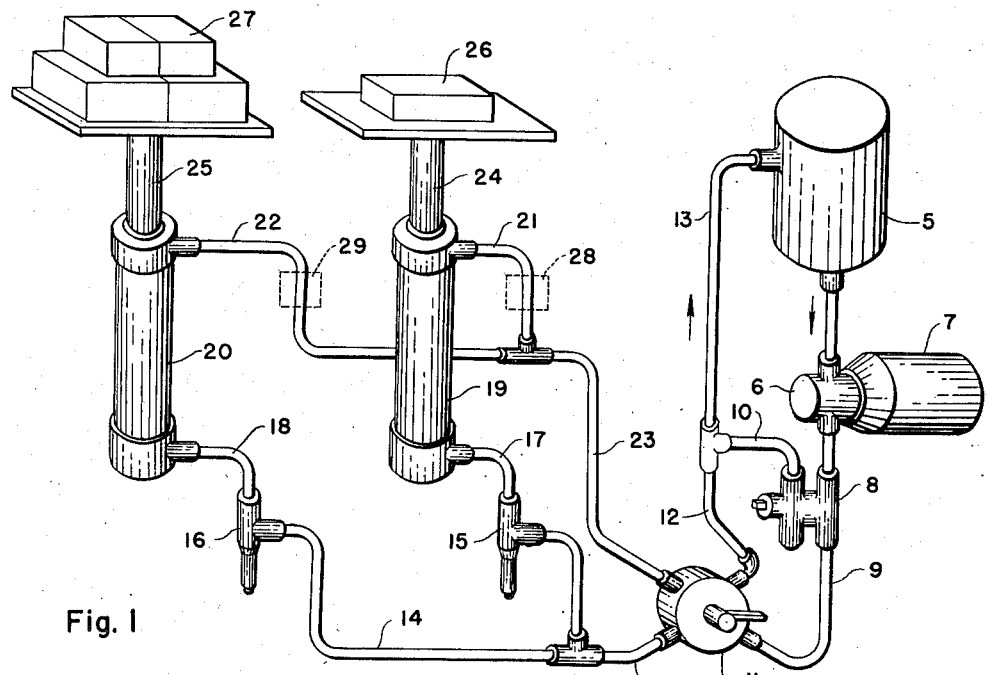
Fig. 1 is a schematic diagram of an improved hydraulic system embodying the flow regulator valves of the present invention.

Referring now to the system shown in Fig. 1, the numeral 5 indicates a reservoir for the storage of a liquid, oil or other suitable hydraulic fluid to be utilized in the actuating system. The reservoir 5 is preferably provided with a filler connection and vent (not shown) and with an outlet connection to the suction side of the pump 6 driven by the motor 7. The pump 6 discharges the hydraulic fluid at a suitably high pressure into the pressure regulator valve 8 which preferably is set to maintain the desired operating pressure. The fluid, passing through the regulator valve 8, discharges into the main pressure line 9, and in the event the pressure delivered to this pressure regulator exceeds the predetermined system pressure, a portion of the fluid is returnd through the by-pass connection 10 into the return line 13, through which it flows back into the reservoir 5.

The main pressure line 9 flows to the directional control or distributing valve 11 which is so ported that it can be manually operated to cause the pressure flow from the line 9 to be open to the pressure line 14, while at the same time providing a fluid communication from the return line 23 to the return line 12, which is opened to the aforementioned return 13 to the reservoir 5. Alternatively, the distributing valve 11 may be adjusted to the position in which the ports between the lines 12 and 14 are in communication, and the pressure from the line 9 is caused to flow into the line 23, for the reverse operation of the system. In the position in which the valve 11 is set in Fig. 1, the ports for the conduits 9 and 14 are in communication for pressure flow into the line 14, and the ports for the conduits 12 and 23 are in communication for return flow to the reservoir 5.

The pressure line 14 is provided with a branch communication for the initial flow regulator valve 15, and the continuation of the pressure line 14 communicates with a second and like flow regulator valve 16. The fluid outlet of the first flow regulator valve 15 communicates through the conduit 17 with the lower end of the actuating cylinder 19, and similarly the outlet of the second valve 16 communicates by means of the conduit 18 with the actuating cylinder or motor 20. It will be understood that the fluid actuating cylinders 19 and 20 are of the type in which a piston is fixed at the lower end of the respective piston rods 24 and 25 and that the respective cylinders are provided with fluid connections 21 and 22 on the opposite or upper sides of the respective pistons. Loads 26 and 27 are shown applied at the upper ends of the piston rods 24 and 25 of the respective actuating motors 19 and 20, and the load 27 is of the order of several times that represented by the numeral 26.

In a conventional constant pressure hydraulic system combining two or more identical actuating cylinders, such as 19 and 20, opposed in their movements by different loads such as 26 and 27, the least loaded cylinder 19 would travel the extent of its stroke at a much higher rate of speed than the more heavily loaded cylinder 20. Such differential in the rates of travel between the pistons within the cylinders 19 and 20 is caused by the back pressure created by the lighter load 26 which is appreciably less than the back pressure created by the heavier load 27. This irregularity in the movement of the respective loads, or the differential in piston travel, is corrected by the inclusion in the respective pressure branches of the improved regulator control valves 15 and 16.

These volume or flow regulator control valves 15 and 16, which are described below in detail in conjunction with the description of Figs. 2 and 3, consist essentially of a variable orifice restrictor needle valve in which the orifice area in a diaphragm is controlled by a tapered pin of the needle valve. The loads on the respective hydraulic pistons create back pressures which act upon these needle valves causing them to become displaced so that the orifice areas become enlarged, thereby regulating the volume or flow on the theory that the flow through an orifice in cubic inches, or other volume per minute, depends primarily upon the area of the orifice and the difference in pressure on the opposite sides of the orifice. Accordingly, by means of the flow regulator valves 15 and 16, when the distributing valve is operated such that the pressure within the conduit 9 flows into the line 14, the pistons within the respective cylinders 19 and 20 move outwardly or upwardly at precisely the same rate, despite the fact that one is loaded several times more than the other. For the purposes of explanation and simplification, the system in Fig. 1 is intended to move the loads upwardly only at the same rate of speed, and in the event it is desired that the pistons also operate in the reverse direction simultaneously, it will be necessary to add similar flow control valves 28 and 29 where indicated by the dotted lines in the conduits 21 and 22, respectively.

Figure 2:
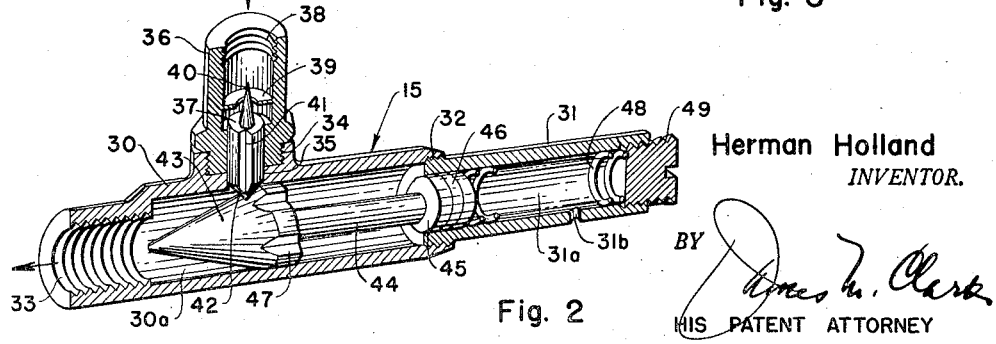
Fig. 2 is a perspective cross-sectional view of the improved flow regulator valves shown in the system in Fig. 1.

A preferred form of the flow regulating valves 15 and 16, of the system shown in Fig. 1 is shown in detail in the cross section in Fig. 2. This valve has a main body or cylindrical portion 30 into one end of which a further cylindrical body portion 31 of somewhat lesser diameter is threadedly engaged at 32. The opposite end of the main body 30 is internally threaded to provide an outlet port or connection 33 and a cylindrical chamber portion 30a is formed between the threaded ends 32 and 33. The main body 30 is also provided with a laterally or upwardly facing threaded inlet 34 and an inlet aperture 35 engageable respectively by the needle valve fitting 36 and the needle valve 37. The outer terminal of the fitting 36 is internally threaded at 38 to provide an inlet connection and the adjacent chamber has transversely fitted therein an orificed diaphragm 39 within which the needle portion 40 of the valve 37 is adapted to move in an axial direction. The main cylindrical portion of the needle valve 37 is provided with a longitudinal port or passage 41 and the inner end of the valve is conically formed as at 42.

Within the chamber portion 30a of the main valve body 30 there is provided a conic cam element 43 affixed to one terminal of a piston rod 44, to the other end of which there is fixed the piston 45 provided with a hydraulic seal 46. The conic cam 43 is provided with peripheral ports 47 which permit fluid pressure to flow past the conic cam 43 into either end of the chamber 30a, whereby this fluid pressure may be exerted upon the piston 45 which is reciprocally mounted for axial movement within the cylindrical bore 31a of the cylindrical housing 31. Outward movement of the piston 45 under this pressure is opposed by a compression spring 48 disposed within the cylinder 31a, the outer end of which is closed by a plug 49 which also serves as an adjustment means for varying the compression of the spring 48 to the predetermined resistance which it is desired be opposed to the fluid pressure within the main chamber 30a. The cylinder 31 is provided with a suitable bleed or relief aperture 31b to permit relief of pressures which may be developed within the cylinder 31a by movement of the piston 45 therein. A suitable detent or stop (not shown) is preferably interposed in the path of the piston 45 to prevent its inadvertent emergence from within the bore 31a.

The operation of the valve 15 shown in Fig. 2 is as follows:

The fluid under pressure enters the inlet port 38 passing through the orifice between the diaphragm 39 and the conic needle valve portion 40, thence through the port or passageway 41 in the cylindrical valve portion 37 and into the main valve chamber 30a, from whence it is permitted to pass outwardly through the valve outlet 33 to the hydraulic cylinder or motor 19, or other actuating means. In the actuation of the cylinder 19, or other power means, a back pressure is developed by the load opposed to the working cylinder. This back pressure is distributed through the ports 47 in the conic cam 43 in such manner that the back pressure becomes equalized at both ends of the main chamber 30a. Such back pressure is accordingly exerted upon the end face of the piston 45 causing it to be displaced outwardly against the resistance of the compression spring 48 and due to the interconnection of the piston 45 with the cam 43, through the intermediacy of the connecting piston rod 44, the conic cam 43 moves outwardly to a similar extent. Inasmuch as the conic end 42 of the needle valve 37 is maintained in contact with the conic cam face 43 as the result of the inward flow from the pressure line connected at 38 into the chamber 30a, the needle valve 37 will be caused to move inwardly into the chamber 30a as the cam 43 is moved away from the outlet 33 by this back pressure. As the needle valve 37 is acted upon by the differential in the pressures at the orifice in the diaphragm 39 its displacement, in order to accommodate the new position of the conical cam 43, will cause an increase in the area of the annular opening within the aperture 39 and about the pin portion 40 of the needle valve 37. This increase in area results in an increased flow through the annular opening at the orifice within the diaphragm 39, and from this it will be apparent that an increase in back pressure resulting in a decrease of differential pressure is compensated for by an increase in the flow area at the orifice, accomplishing thereby, volume flow regualtion. In the outward movement of the piston 45, the air entrained within the cylinder 31a is displaced to the atmosphere through the opening 31b and the rubber doughnut seal 46 serves to prevent hydraulic fluid within the system from passing into the chamber 31a past the piston 45.

Figure 3:
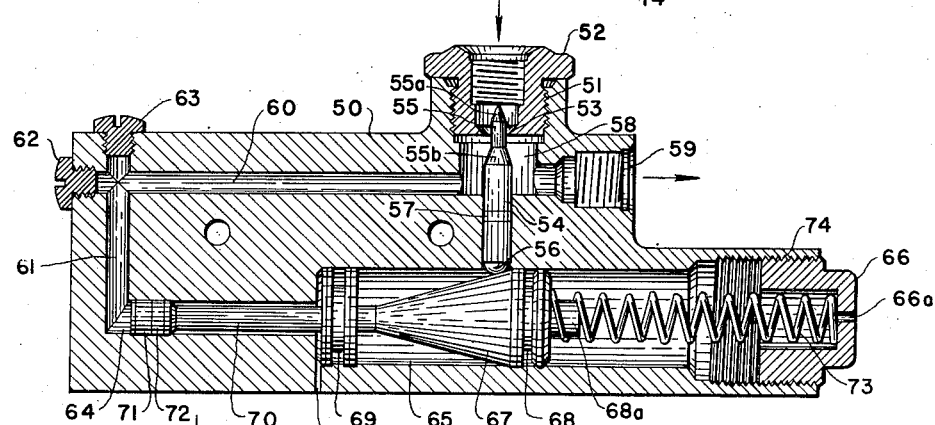
Fig. 3 is a cross-sectional view of a modified form of flow regulator valve.

The modified form of the flow regulator valve shown in Fig. 3 comprises a main body or block 50 having a threaded inlet connection 51 adapted to receive the similarly threaded inlet fitting 52 which also is provided with the metering or nozzle orifice 53 at its inner end. A needle valve 54 is reciprocally mounted within the body 50 in axial alignment with the orifice 53 and has a reduced diameter metering end portion 55 coaxially disposed within the nozzle orifice 53. The opposite end of the needle valve 54 is provided with a ball contact 56 and an intermediate portion is provided with a pressure seal 57 to prevent hydraulic fluid from passing through the body portion within which the needle valve is movable.

Within the valve body 50 there is a needle valve chamber 58 surrounding the valve 54 and providing direct communication from the inlet 52 of the body 50, past the nozzle orifice 53, and direct communication with the threaded outlet 59. Within the body portion opposite the outlet 59, and in communication with the valve chamber 58, is a cylindrical passage or duct 60 communicating with a transverse duct 61, being closed by the threaded plugs 62 and 63, respectively. Parallel to the passage 60 and on the opposite side of the valve body 50 there is a cylindrical bore 64 axially aligned with a larger cylindrical bore 65. An adjustably threaded plug 66 closes the far end of the enlarged cylindrical bore 65 within which the conic cam 67 is adapted to be slidably guided by the guide piston portions 68 and 69.

To the opposite side of the piston 69 there extends a connecting or piston rod 70 at the end of which is fixed a piston 71, of relatively smaller diameter than the guide pistons 68 and 69, to slidably fit within the cylindrical bore 64. The piston 71 carries a hydraulic seal, preferably of the ring type at 72 to prevent fluid under pressure within the passages 60 and 61 exerted against the end of the piston 71 from passing into the bore beyond the piston toward the guide piston 69. Small amounts of hydraulic fluid, however, which may leak past the seal 72 are permitted to drain out through the drain passage 50a which also permits entrapped air displaced by the guide piston 69 to pass to the atmosphere and thereby relieve any pressures which might be developed between the pistons 69 and 71.

The opposite side of the guide piston 68 is provided with an extended stub portion 68a which serves to guide and retain the end of a compression spring 73 which abuts at its opposite end against the above-mentioned end plug 66 threadedly engaging the main body 50 at the threads 74. The end plug 66 is also provided with a relief opening 66a through which any entrained air within the adjacent portion of the cylinder 65 may be discharged to the atmosphere upon outward movement of the conic cam 67 against the compression spring 73.

The operation of the modified form of the valve shown in Fig. 3 is substantially the same as that of valves 15 and 16, shown in Figs. 1 and 2. The most essential difference in the operation of the two valves lies in that the conic cam portion 67 of the valve of Fig. 3 operates within an air cylinder rather than directly in the hydraulic fluid stream as in the case of the conic cam 43. This is accomplished in the Fig. 3 modification by providing the additional fluid passages 60, 61 and 64, causing the small plunger piston 71 to be exposed to the system pressure. Another difference in the operation of these two valves resides in the provision of the straight cylindrical portion 55 of the needle valve terminating in the conic metering portions 55a and 55b, which causes a uniform metering over an extended portion of the movement of the conic cam 67 and of the like movement of the needle valve 54 while the cylindrical portion 55 is disposed within the orifice 53; with an increasing rate of flow as the conic end 55a is disposed within the orifice; and a decreased rate of flow as the larger conic portion 55b nears the same orifice. The operation of the modification of the valve of Fig. 3 is accordingly as follows:

With the metering pin portion 55 disposed within the orifice 53 as shown in the figure, the rate of flow from the inlet 52 to the outlet 59 is of an intermediate magnitude, and as the load upon the hydraulic motor connected to the outlet 59 is increased and back pressure is created, it is reflected through the passages 60 and 61 into the end of the bore 64 and against the end of the piston 71. This causes outward movement of the piston 71 and the attached conic cam 67, guided by the pistons 68 and 69, permitting the ball follower 56 on the needle valve 54 to move downwardly toward the axis of the conic cam 67. Should the back pressure so developed become sufficiently great, the outward movement of the piston 71 and its attached components compressing the spring 73 beyond a predetermined extent, the needle valve 54 is permitted to move further downwardly as the conic cam 67 moves outwardly permitting the conic end portion 55a to pass downwardly across the restricted portion of the orifice 53. As the cross-sectional area of the resulting opening increases, however, increased flow passes through the orifice and the more heavily loaded opposition to the hydraulic motor causing the back pressure is overcome by the additional fluid flow which maintains the desired rate of movement of the moving parts of the hydraulic motor and its accompanying load. Similarly as the back pressure may again fall off, the spring 73 causes the conic piston to move inwardly again as the pressure in the bore 64 against the end of the piston 71 is reduced and the straight cylindrical portion of the metering pin 55 again becomes disposed within the orifice 53. As mentioned above, the air within the outer portion of the cylinder 65 is displaced upon outward movement of the conic cam 67 through the orifice 66a and as the conic cam 67 returns in its inward movement, the air is permitted to return, and the air ahead of the guide piston 69 is then permitted to be relieved through the vent passage 50a.

In the system shown in Fig. 1 in which the pistons 24 and 25 are synchronized in their upward strokes only, it will be obvious that the return of the pistons to their retracted positions is accomplished by adjustment of the distributing valve 11 to feed the hydraulic pressure fluids from the conduit 9 into the conduits 23, 21 and 22 to the upper ends of the cylinders and returning the same under unequal rates of travel in view of their unequal loading, or in the event they become unloaded at the end of their upstroke, they would be returned at equal rates of travel. In such a situation, the hydraulic flow regulator in the lower part of the system acts merely as by-pass valves and the fluid which is forced from the lower part of the cylinder acts to release the metering pin by forcing over the cam on which it is sustained to permit the fluid to be returned to the reservoir or accumulator, and is merely a reversal of the original action of the valve. The adjusting nuts 49 and 66 which are incorporated in the respective modifications of the valve, are utilized to adjust the spring characteristics for specific applications in which the valves are used and it is not necessary that these nuts be adjusted once the spring has been set. For example, should it be desired to use the valves in a 3000 p. s. i. hydraulic system, the spring will be adjusted by the taking up of the nuts to the required spring resistance and once having been so adjusted, no further calibration will be necessary. Thus, identically adjusted regulator valves will cause differently loaded cylinders to be operated in unison. The valves shown have been tested with loads varying from 150 to 800 pounds difference and it was found that the two cylinders subjected to the different loads moved uniformally when the hydraulic flow at each cylinder was regulated by the present valve.

As has been indicated above, in connection with the description of Fig. 1, when only two of the hydraulic flow regulator valves, such as 15 and 16, are incorporated in the system, the return movement of the pistons would not be in unison. However, in applications where unequal loads would be borne both on the outward and inward strokes, it may be desirable to provide a modification of the system shown in Fig. 1 in which an additional pair of flow regulator valves 28 and 29 would be provided in order to equalize the return rates of movement also. Similar results, however, may be obtained by the use of a dual type distributing valve in conjunction with but one flow regulator control valve for each actuating cylinder. In the latter system, this would be accomplished by a dual-, or a pair of simultaneously actuated-, distributing valves installed on the actuating cylinder side of the flow regulator valves and ported such that the flow of the pressure fluid would always be through the regulator valves in the same direction.

The present hydraulic actuating system and the improved regulator valves have proven a particularly efficient means for regulating the rates of travel of hydraulic cylinders in a parallel system such as the hydraulic landing gears of aircraft, as well as the wing flaps and cowl jacks used on airplanes. The present invention is not, however, limited to the actuation of these or other aircraft components, but enjoys general applicability, being capable of use for example as a flow regulator for sheet metal press cylinders, as well as industrial and other applications where either or both the outward and return strokes of the pistons are desired to be synchronized and controlled.

Other forms and modifications of the present invention both with respect to its general arrangement and the details of its respective parts, which may become obvious to those skilled in the art after reading the present description, are intended to come within the scope and spirit of this invention as more particularly set forth in the following claims.

I claim:

1. A flow regulator valve comprising a valve body having inlet and outlet connections, a fluid passage extending between said inlet and outlet connections, a cylindrical bore within said valve body having one end of said bore in communication with said fluid passage, a spring-opposed conic camming piston axially movable within said cylindrical bore in response to fluid pressures developed in the region of said outlet connection and transmitted through said fluid passage to said open end of said cylindrical bore, non-closable metering valve means including an axially floating element operatively disposed within said fluid passage on the inlet connection side of said fluid passage, said valve means having an opposite terminal in sliding contact with said camming piston, said valve means movable in response to movement of said camming piston whereby increased pressure in the region of said outlet connection initiates movement of said camming piston and further opening of said metering valve means for the increased flow through said fluid passage, said camming piston and said metering valve means each provided with fluid seals against said valve body whereby said camming piston does not work within the same system fluid being regulated by said valve.

2. A flow regulator valve comprising a valve body provided with an inlet connection and an outlet connection, a fluid passage extending between said inlet and outlet connections, a main bore portion within said valve body, a supplemental bore portion having one end open to and in axial alignment with said main bore portion, the opposite end of said supplemental bore portion being open to said fluid passage, a spring opposed conic piston assembly having piston portions axially movable within each of said bore portions in response to pressure at said outlet connection, an axially movable needle valve element reciprocable within a further bore portion in said valve body between said inlet connection and said main bore portion, said needle valve element having a pointed terminal portion directed toward said inlet connection and an opposite contact portion in engagement with a conic piston of said piston assembly in such manner that said needle valve element is movable in response to axial movement of said conic piston assembly, said needle valve element having its pointed terminal portion directed into the fluid flow into said inlet connection in such manner that said needle valve element is urged into contact with said conic piston, and an orifice disposed within said fluid passage adjacent said inlet connection arranged to be regulated by said needle valve element for increased flow as pressure within said outlet connection is increased thereby initiating movement of said conic piston portion and said needle valve element, said conic piston assembly and said needle valve element each provided with fluid-tight seals against said respective bores whereby said piston assembly is not required to operate within the same system fluid being regulated by the flow regulator valve.

3. In a flow regulator valve the combination with a body portion having inlet and outlet ports therein, a cylindrical bore within said body portion in communication with said inlet and outlet ports, a piston having a conic cam axially movable within said cylindrical bore portion under the influence of back pressure within said outlet port and adjustable spring means for opposing the axial movement of said camming piston, of an orifice in communication with said inlet port and an axially floating needle valve element having axially spaced conic portions and an intermediate metering portion extendable through said orifice and a further follower portion in contact with the conic cam of said piston whereby increased pressure initiating axial movement of said piston imparts opening movement to said floating needle valve element and increased flow through said orifice, said needle valve element having a straight cylindrical portion between its conic portions for the uniform metering of the fluid over an extended portion between its opening and closing positions.

4. A hydraulic flow regulator valve comprising a body portion having inlet and outlet connections, a cylindrical bore portion within said valve body, a spring-opposed camming piston axially movable within said cylindrical bore portion, an axially floating metering element disposed in a fluid passage extending between said inlet and outlet connections, said floating metering element having axially spaced conic portions adjacent a first terminal of said element, said floating metering element having an opposite terminal portion in contact with said camming piston for axial movements upon movement of said camming piston resulting from increased pressures developed within said cylindrical bore portion, said floating metering element having a straight cylindrical portion disposed between said conic portions for uniform fluid metering over an extended movement, an orifice disposed wiithin said fluid passage for cooperating with said floating metering element whereby increased pressure within said cylindrical bore portions initiates movements of both camming piston and said floating metering element for increased flow through said fluid passage.

5. A flow regulator valve comprising a body portion, inlet and outlet ports within said body portion, a passage within said body portion in communication with said inlet and outlet ports and providing for fluid flow therebetween, a cylindrical bore within said body portion, a cam member adapted for axial movement within said cylindrical bore, a supplemental bore within said body portion in axial alignment with and open to said first cylindrical bore portion, said supplemental bore being in fluid communication with said fluid passage between said inlet and outlet ports, said cam member having an attached piston portion axially movable within said supplemental bore, adjustable resilient means opposing axial movements of said cam member within said cylindrical bore initiated by pressure actuated movements of said piston within said supplemental bore, an orifice disposed within said valve body across said fluid inlet port, an axially floating needle valve member having axially spaced conic portions forming a metering end portion axially movable through said orifice, said valve member having a straight cylindrical intermediate portion for uniform metering over an extended movement, said needle valve having a follower portion held in contact with said cam member by the fluid flow past said floating valve member in such manner that pressure actuated movements of said piston and like movements of said cam members initiated by increased pressure within said fluid passage causes axial movement of said needle valve member through its contact with said cam member for adjustment of said inlet orifice to permit increased flow from said inlet port through said fluid passage to said outlet port.

HERMAN HOLLAND.

References Cited in the file of this patent

UNITED STATES PATENTS

| Number | Name | Date |
|---|---|---|
| 501,959 | Rawlings | July 25, 1893 |
| 856,981 | McCarroll | June 11, 1907 |
| 1,039,520 | Graetz | Sept. 24, 1912 |
| 1,210,712 | Scott | Jan. 2, 1917 |
| 1,225,238 | Gray | May 8, 1917 |
| 1,268,511 | String | June 4, 1918 |
| 1,896,421 | Quivey | Feb. 7, 1933 |
| 1,925,610 | Shinn | Sept. 5, 1933 |
| 1,966,841 | Zelov | July 17, 1934 |
| 2,020,773 | Ernst | Nov. 12, 1935 |
| 2,196,120 | Parker | Apr. 2, 1940 |
| 2,326,138 | Grant | Aug. 10, 1943 |
| 2,376,320 | Butrovich et al. | May 22, 1945 |
| 2,415,603 | Muller et al. | Feb. 11, 1947 |

FOREIGN PATENTS

| Number | Country | Date |
|---|---|---|
| 639,219 | France | Aug. 8, 1927 |